Patented Nov. 21, 1944

2,363,338

UNITED STATES PATENT OFFICE 2,363,338

PROCESS FOR THE MANUFACTURE OF ENOL ETHERS OF $\alpha,\beta$-UNSATURATED STEROID KETONES

Heinrich Köster, Berlin-Charlottenburg, Germany, assignor to Schering Corporation, Bloomfield, N. J., a corporation of New Jersey No Drawing. Application June 8, 1940, Serial No. 339,486. In Germany June 16, 1939

20 Claims. (Cl. 260—397.4)

This invention relates to enol derivatives of $\alpha,\beta$-unsaturated steroid ketones and most particularly to enol ethers of said compounds and a method of making the same.

In U. S. application Serial No. 308,206 a process is described involving the manufacture of cyclic acetals of keto steroids, said process consisting in reacting the ketosteroids with polyvalent alcohols or alkylene oxides preferably in the presence of a catalyst. In U. S. application Serial No. 233,346, which has issued as Patent No. 2,294,433, dated September 1, 1942, a process is described for the conversion of diketones of the steroid series to the corresponding hydroxy ketones by forming first mono enol ethers of said diketones and then reducing the free keto group to the hydroxy group.

I have found that on reacting $\alpha,\beta$-unsaturated ketosteroids with alcohols, enol ethers may be obtained in a simple manner and with a very good yield. This good yield of enol ethers is obtained by continuously removing the water formed during reaction. In a manner herein described more in detail even enol ethers of a complicated structure may be synthesized by reacting alcohols of complicated structure or of high molecular weight with ketosteroids under the conditions set forth, e. g. cholesteryl enol ethers of cholestenone, or enol ethers of alcohols, whose so-called ortho esters, such as orthoformic acid esters, are unknown.

According to the process of this application enol ethers are obtained in a very good yield by directly reacting steroid ketones with alcohols, preferably in the presence of catalysts, at the same time removing the water formed e. g. by distillation as an azeotropic mixture or by combining the water by means of anhydrous salts like calcium chloride, sodium sulfate and the like. Without continuously removing the water, the manufacture of enol ethers of complicated structure is very difficult and the yield is rather poor.

For performing the reaction a special apparatus is suitably employed, as described, for instance, in the textbook "Organic Syntheses" vol. 1, pages 40, 41 and 42, New York (1932) or by Meyer in Liebigs Annalen vol. 433 page 331 (1923) modified by Salmi, Berichte vol. 71 page 1803–1804 (1938).

As a catalyst preferably acids are used such as for instance p-toluene sulfonic acid, hydrochloric acid and so on.

As a solvent capable of forming azeotropic mixtures with the water formed during reaction, hydrocarbons such as benzene, toluene and the like are preferably used. Compare also M. Secat, La tension de vapeur des mélanges de liquides, L'azeotropisme Bruxelles 1918 and further publications of this author.

When using di- or poly ketones of the steroid series as starting material it is possible to obtain mono as well as di or poly enol ethers. The formation of the different enol ethers depends upon the amount of alcohol employed for the reaction. It is, however, possible to obtain mono enol ethers in a very good yield when reacting the ketone with a small excess of the equivalent amount of the alcohol.

The mono enol ethers of steroid diketones, such as androstendione, are of especial importance; for, by reduction by means of methods known to the expert for transforming a keto group into a hydroxy group, hydroxy-ketone enol ethers, such as testosterone enol ether, are obtained which either have a pronounced physiological activity or can readily be converted into the corresponding hydroxy ketones, such as testosterone, by hydrolizing the enol ether, for instance, by treatment with dilute mineral acids.

The enol ethers such as testosterone benzylenol ether and the like are characterized by a very protracted physiological action. Tested by the capon's comb test the testosterone benzyl enol ether was six times more active than testosterone. The action of testosterone lasted for five days whilst the action of the equivalent amount of said enol ether lasted for twenty days. The testosterons cyclohexyl enol ether was about twice as active as testosterone.

The invention may be illustrated by the following examples without, however, being limited to them.

*Example 1*

2.85 gs. of androstendione are dissolved in 70 ccm. of benzene, thereto are added 1.2 gs. of benzyl alcohol and a few crystals of p-toluene sulfonic acid and the reaction mixture is heated to boiling in an apparatus adapted for distillation of an azeotropic mixture. The azeotropic mixture of benzene and water distills from the reaction mixture and is freed from water after condensation, the distillate separating into two layers, one of which contains the benzene and the other the water whereafter the benzene free of water is allowed to flow back into the reaction vessel. After boiling for 16 hours the mixture is evaporated to dryness in vacuo. On triturating the residue with alcohol, crystals are formed. The crystals are isolated and recrystallized from alcohol containing suitably a small amount of pyridine. The androstendione-3,17-enol benzylic ether-3 melts at 164° C. and shows a specific rotation of $(\alpha)_D^{20} = -65.3°$ in dioxane.

Its configuration is shown by the following formula:

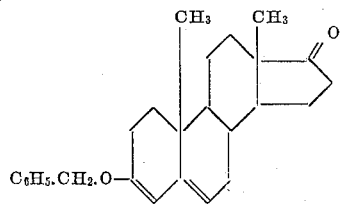

1 g. of androstendione-enol benzylic ether is dissolved in 30 ccs. of n.propyl alcohol. The solution is heated to boiling and 0.75 g. of sodium are added thereto. After the sodium has dissolved the testosterone-enol benzylic ether is precipitated by addition of water, filtered off and recrystallized from methanol. It melts at 153° C. and shows a specific rotation of $(\alpha)_D^{20} = -110.3°$ in dioxane.

Its structure is shown by the following formula:

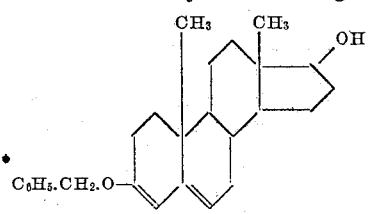

Example 2

2.84 gs. of androstendione are dissolved in 70 ccs. of benzene. 1.1 gs. of cyclohexyl-alcohol and a few crystals of p-toluene sulfonic acid are added. The mixture is then heated to boiling in the above described special apparatus. The azeotropic mixture of benzene and water distills from the mixture, is freed from water and the water-free benzene reconducted to the reaction vessel. After boiling for 16 hours the mixture is evaporated to dryness in vacuo. On triturating with alcohol the residue crystallizes. The crystals are isolated and recrystallized from alcohol under addition of a small amount of pyridine. The androstendione-enol cyclohexyl ether melts at 164° C. and shows a specific rotation of $(\alpha)_D^{20} = -79°$ in dioxane.

Its structure is shown by the following formula:

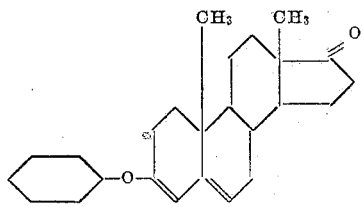

3.5 gs. of said androstendion-3,17-cyclohexyl enol ether are dissolved in 30 ccs. of n.propyl alcohol. The solution is heated to boiling and 0.75 g. of sodium are added thereto. After the sodium has dissolved the testosterone cyclohexyl enol ether is precipitated by addition of water, filtered off and recrystallized from methanol. It melts at 130-131° C.; and shows a specific rotation of $(\alpha)_D^{20} = -114.2°$ in dioxane.

The following formula shows its constitution:

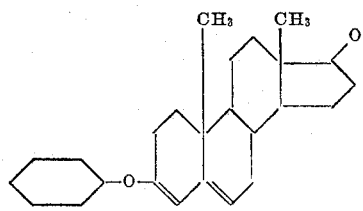

Example 3

1.92 gs. of cholestenone and 1.93 gs. of cholesterol are dissolved in 80 ccs. of benzene and after addition of p-toluene-sulfonic acid reacted according to Example 1. The cholestenone cholesteryl enol ether formed is recrystallized from acetone. It melts at 218° C. and shows a specific rotation of $(\alpha)_D^{20} = -90°$ in benzene.

The structure of said compound is shown by the following formula:

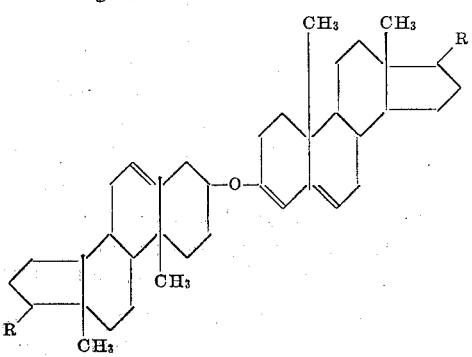

Example 4

By reacting pregnendione and benzyl alcohol in benzene in the presence of p-toluene sulfonic acid according to Example 1 the pregnendione benzyl enol ether is obtained and purified by recrystallization from methanol. It melts at 192° C. and has a specific rotation of $(\alpha)_D^{20} = -50.3°$ in dioxane.

Its structure is as follows:

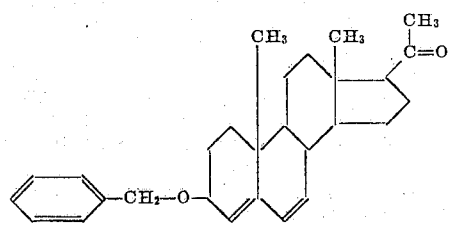

Example 5

3.84 gs. of cholestenone and 1 g. of n.butyl alcohol are dissolved in 80 ccs. of benzene, mixed with 10 mgs. of hydrogene chloride in absolute alcohol and boiled in a special apparatus while continuously removing by distillation the water formed. After 16 hours of boiling, an alcoholic solution of potassium hydroxide is added, the mixture poured into water and extracted with ether. The ethereal solution is washed with water, dried and evaporated. The remaining oil crystallizes on treating with alcohol. After purifying by means of n.propyl alcohol the cholestenone n.butyl enol ether melts at 97° C. and shows a specific rotation of $(\alpha)_D^{20} = -93°$ in dioxane. It has the formula

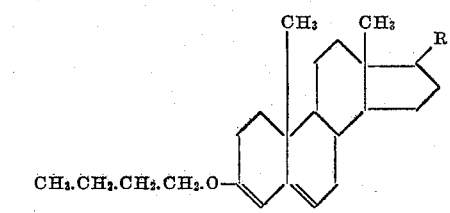

Example 6

In a charge according to Example 5 instead of hydrochloric acid p-toluene sulfonic acid is applied and to the mixture there are added 2 gs. of anhydrous sodium sulfate. In this case no distillation is necessary, but the mixture is boiled for 16 hours under reflux. It is then worked up according to Example 5 yielding the same substance in a yield of 48.5%.

Of course, various changes may be made in the details disclosed in the foregoing specification without departing from the invention and the claims annexed hereto.

What I claim is:

1. Process for the manufacture of enol ethers of $\alpha,\beta$-unsaturated steroid ketones comprising reacting an $\alpha,\beta$-unsaturated ketosteroid with an alcohol and removing the water formed during reaction.

2. A process according to claim 1, comprising using an aromatic alcohol as reaction component.

3. A process according to claim 1 comprising using benzyl alcohol as reaction component.

4. A process for the manufacture of enol ethers of $\alpha,\beta$-unsaturated steroid ketones comprising reacting an $\alpha,\beta$-unsaturated ketosteroid with an alcohol in the presence of an acidic catalyst.

5. A process for the manufacture of enol ethers of $\alpha,\beta$-unsaturated steroid ketones comprising reacting an $\alpha,\beta$-unsaturated ketosteroid with an alcohol in a solvent forming with water an azeotropic mixture and distilling off the water of reaction.

6. A process for the manufacture of enol ethers of $\alpha,\beta$-unsaturated steroid ketones comprising reacting an $\alpha,\beta$-unsaturated ketosteroid with an alcohol in the presence of an acidic catalyst in a solvent capable of forming an azeotropic mixture with water on distillation, and removing the water formed during reaction, continuously from said azeotropic mixture.

7. A process according to claim 1 comprising using androstendione as starting material.

8. A process according to claim 1 comprising using pregnendione as starting material.

9. A process according to claim 4 comprising using p-toluene sulfonic acid as a catalyst.

10. A process according to claim 4 comprising using hydrochloric acid as a catalyst.

11. A process according to claim 5 comprising using benzene as a solvent.

12. Androstendione-3,17-benzyl enol ether-3 of M. P. 164° C. and $(\alpha)_D^{20} = -65.3°$ in dioxane.

13. Testosterone benzyl enol ether of M. P. 153° C. and $(\alpha)_D^{20} = -110.3°$ in dioxane.

14. Pregnendione benzyl enol ether of M. P. 192° C. and $(\alpha)_D^{20} = -50.3°$ in diozane.

15. A process according to claim 1 comprising removing the water formed during reaction by means of anhydrous salts.

16. A process for the manufacture of enol ethers of hydroxy ketones of the steroid series comprising reacting an $\alpha,\beta$-unsaturated steroid poly ketone with an alcohol, removing the water formed during reaction, and reducing free keto groups present in known manner to transform said free keto groups into hydroxy groups.

17. A process according to claim 16, wherein the enol ether of the hydroxy ketone of the steroid series is hydrolized to the corresponding hydroxy ketone.

18. A process for the manufacture of testosterone, comprising reacting androstendione with an alcohol to form the 3-enol ether, removing the water formed during reaction, reducing the mono-3-enol ether of androstendione-3,17 obtained to the corresponding 3-enol ether of androstenol-17-one-3, and hydrolizing the latter to testosterone.

19. The benzyl enol ether of an $\alpha,\beta$-unsaturated steroid ketone.

20. The benzyl enol ether of a 3-keto-$\Delta_{4,5}$-steroid having at the 17-position a member of the class consisting of alcohol and keto groups.

HEINRICH KÖSTER.